United States Patent
Movalli et al.

(10) Patent No.: US 6,745,936 B1
(45) Date of Patent: Jun. 8, 2004

(54) METHOD AND APPARATUS FOR GENERATING SECURE ENDORSED TRANSACTIONS

(75) Inventors: Michael Movalli, Manchester, MA (US); Brian Movalli, Lowell, MA (US)

(73) Assignee: Orion Systems, Inc., Danvers, MA (US)

(*) Notice: Subject to any disclaimer, the term of this patent is extended or adjusted under 35 U.S.C. 154(b) by 955 days.

(21) Appl. No.: 08/697,421

(22) Filed: Aug. 23, 1996

(51) Int. Cl.[7] .............................................. G06F 17/60
(52) U.S. Cl. ...................... 235/379; 235/380; 235/382; 235/382.5; 705/44
(58) Field of Search ................. 235/379, 380, 235/382.5, 383, 375, 492; 705/42, 44

(56) References Cited

U.S. PATENT DOCUMENTS

| | | | |
|---|---|---|---|
| 4,206,315 A | | 6/1980 | Matyas et al. |
| 4,304,961 A | | 12/1981 | Campbell, Jr. |
| 4,314,097 A | | 2/1982 | Campbell, Jr. ............... 235/380 |
| 4,825,050 A | * | 4/1989 | Griffith et al. ............... 235/379 |
| 4,849,613 A | * | 7/1989 | Eisele ......................... 235/379 |
| 5,388,212 A | | 2/1995 | Grube et al. |
| 5,428,210 A | | 6/1995 | Nair et al. ................... 235/375 |
| 5,448,044 A | | 9/1995 | Price et al. .................. 235/380 |
| 5,481,672 A | | 1/1996 | Okuno et al. |
| 5,524,073 A | | 6/1996 | Stambler ..................... 380/24 |
| 5,557,518 A | * | 9/1996 | Rosen .......................... 235/380 |
| 5,590,038 A | * | 12/1996 | Pitroda ........................ 705/41 |
| 5,689,565 A | * | 11/1997 | Spies et al. .................. 380/25 |
| 5,712,914 A | * | 1/1998 | Aucsmith et al. ............. 380/30 |
| 5,748,737 A | * | 5/1998 | Daggar ........................ 705/41 |
| 6,011,858 A | * | 1/2000 | Stock et al. ................. 382/115 |

OTHER PUBLICATIONS

Donald W. Davies, "Use of the 'Signature Token' to Create a Negotiable Document", *Advances in Cryptology; Proceedings of Crypto '83*, pp. 377–382.*
S. Even, O. Goldreich, and Y. Yacobi, "Electronic Wallet" *1984 International Zurich Seminar on Digital Communications*, IEEE Procedings, pp. 199–201.*

* cited by examiner

Primary Examiner—Michael G. Lee
Assistant Examiner—Ahshik Kim
(74) Attorney, Agent, or Firm—Finnegan, Henderson, Farabow, Garrett & Dunner, L.L.P.

(57) ABSTRACT

To ensure the data corresponding to transactions has not been altered, a method and system are provided for generating secure endorsed transactions having transaction data representative of transactions and unique identifiers corresponding to parties endorsing the transactions. After receiving input, including transaction data and unique identifiers, unique codes are generated from the transaction data and unique identifiers. The unique codes constitute secure endorsements of the transaction data by the parties corresponding to the unique identifiers.

8 Claims, 9 Drawing Sheets

METHOD AND APPARATUS FOR GENERATING SECURE ENDORSED TRANSACTIONS

BACKGROUND OF THE INVENTION

A. Field of the Invention

The present invention relates to point of sale equipment and, more particularly, to methods and apparatus for generating secure endorsed transactions. The invention facilitates the generation of secure endorsed transactions by combining data representative of a transaction with a unique human identifier representative of the human that endorsed the transaction, such as a biometric, in a way that neither the transaction data nor the human identifier can be altered without detection.

B. Description of the Related Art

The credit card has become one of the primary methods of paying for goods and services throughout the world. People use credits cards every day to pay for a wide variety of goods and services, such as: food at a grocery store, clothes at a department store, gas at a gasoline station, airline tickets at a travel agent, automobiles at a car dealer, etc. Because of the nature of credit cards they have also become a primary means for transacting business over the Internet, another source of goods and services.

In order for a credit card transaction to be processed, a merchant must collect a variety of data associated with the transaction. This data typically includes the purchase price and date of the transaction, the account number and expiration date of the credit card, and the cardholder's name. The merchant may also collect the cardholder's signature, although it is generally not considered a part of the transaction data.

Once the transaction data is collected, the merchant transmits it, along with data identifying the merchant, to a credit card transaction processor. The credit card processor sorts the data according to the company that issued the credit card, and forwards the data to the appropriate company. At that point, the credit card issuer posts the transaction to the cardholder's account and the purchase amount is credited to the merchant.

In the past, credit card transaction data was recorded, transferred, and stored in the form of paper receipts. Over the years, the credit card industry has developed equipment that provides for the electronic acquisition, transmission, and storage of transaction data. This equipment, which is sometimes referred to a point of sale (POS) equipment, usually includes electronic terminals that read the account number and expiration date from a magnetic stripe on the credit card and transmit the transaction data to the credit card processor. In addition to reducing the industry's reliance on paper records, this equipment expedites the processing of credit card transactions and minimizes errors associated with the entry of transaction data.

Despite these advances, the typical credit card transaction still relies primarily on paper. For example, a cardholder presents a credit card to a merchant, who records transaction data using an electronic terminal. The recorded data includes the amount of the purchase, the cardholder's account number, the card's expiration date, the merchant identification number, and the date of the transaction. Once the terminal accumulates the transaction data, the terminal automatically dials the merchant's credit card processor or other authorization source and initiates an authorization request. When the transaction is authorized, the terminal displays and/or stores the approval code or authorization indicia received from the credit card processor. The approval code is recorded along with the other transaction data. The POS equipment typically includes a printer that is capable of printing a sales receipt. The sales receipt includes the transaction data and approval code, and provides a space for the cardholder's signature.

These prior art devices allow numeric data, such as purchase price, date, account number, and merchant identification number to be easily accumulated, stored, and transmitted between the merchant and credit card processor. Consequently, numeric transaction data may be transferred and stored without the use of paper receipts. Although this numeric data is sufficient to process the transaction, it is generally regarded as insufficient to validate or authenticate a transaction that is disputed by the cardholder. In the event a cardholder questions or denies the legitimacy of a transaction that appears on his or her credit card statement, it may be necessary for the merchant to produce a copy of the signed receipt as evidence that the cardholder was a party to the transaction. The signed receipt contains all of the necessary transaction data (date, time, store identification, sale items, prices, taxes, and signature) to verify the transaction. Therefore, it is necessary that a copy of each signed receipt be retained by the merchant for some period of time.

The storage and retrieval of signed receipts is costly, in terms of space, resource, and labor. Since the receipts must be stored for a long period of time, it is not uncommon for merchants to have a centralized storage area that encompasses tens of thousands of square footage of file cabinets containing the paper slips. Many merchants elect to convert the paper to microfiche and pay fees for shipping, conversion and storage. There is cost associated with the paper itself, as well as postage in sending the paper slips from the retail stores to the centralized storage location. Labor costs occur all throughout the handling process, from the shipment of the paper to the storage and retrieval of the paper. It is also not uncommon for a large merchant to staff 20 or more full-time employees whose sole function is to retrieve the paper slips to settle customer disputes.

Beyond the storage and retrieval of the receipts, lies a cost associated with the failure to locate them when necessary. Failure to locate a receipt is not uncommon because of the inherent difficulties of storing large quantities of paper, (especially in retail because the physical size of the paper is small) and the fact that there is typically a time frame associated with retrieving the paper. When working with credit card issuers, the time frame can be as short as 48 hours. This means that if the receipt is not located in 48 hours, then the receipt is considered either lost or was never in existence. In either case, the merchant will lose the amount of the sale that is sometimes referred to as a charge back.

This process of retaining and retrieving signed receipts is made easier if the merchant employs POS equipment that allows the cardholder's signature to be digitized, transmitted, and stored along with the numeric data associated with the transaction. See, for example, U.S. Pat. No. 5,448,044. In such cases, the signature is digitized as the cardholder signs the credit card receipt. The digitized signature data and numeric transaction data are combined and transmitted to the credit card processor, where the data is stored for a predetermined period of time. If a cardholder disputes the validity of a transaction, the entirety of the transaction data, including a facsimile of the signature, may be provided by the credit card processor, and may serve as evidence of the legitimacy of the transaction. See, for example, U.S. Pat. No. 5,428,210 for a "Data card terminal with embossed character reader and signature capture."

While the combination of digitized signature data and numeric transaction data provides evidence of the legitimacy of the transaction when a dispute arises, it is not tamper resistant. Specifically, conventional systems that provide a combined digitized signature data and transaction data fail to address the problems associated with security of the combined data. For example, the digitized signature data associated with the transaction data for one transaction may be misappropriated and assigned to the transaction data for a different transaction. Similarly, transaction data itself may be modified or altered, thereby corrupting the data and making it, as well as the associated digitized signature data, unreliable.

SUMMARY OF THE INVENTION

Accordingly, the present invention is directed to methods and apparatus for generating secure endorsed transactions that obviate one or more of the problems due to limitations and disadvantages of the related art.

Features and advantages of the invention will be set forth in the description which follows, and in part will be apparent from the description, or may be learned by practice of the invention. The objectives and other advantages of the invention will be realized and attained by the method and apparatus particularly pointed out in the written description and claims thereof as well as the appended drawings.

To achieve the objective of this invention and attain its advantages, broadly speaking, this invention includes a method of generating secure endorsed transactions comprised of transaction data representative of transactions and unique identifiers corresponding to parties endorsing the transactions. In its broadest sense, the method has two steps, which would be performed by a data processing system. First, the system receives transaction data and unique identifiers. Then it generates unique codes from the transaction data and unique identifiers. The unique codes constitute secure endorsements of the transaction data by the parties corresponding to the unique identifiers.

According to another aspect of the present invention, there is provided a method of generating tamper resistant secure endorsed transactions comprised of transaction data representative of transactions, unique human identifiers corresponding to at least one party, called first party, endorsing a transaction, and public keys corresponding to at least a second party endorsing a transaction. The public keys have corresponding private keys maintained in secret by the second party. The method has three steps, which are performed by a data processing system. First, the system receives a transaction data, a unique human identifier, and a public key. Next, a unique code is generated from the transaction data, the unique human identifier, and the public key. The unique code constitutes a secure endorsement of the transaction data by the first party. Lastly, using a private key corresponding to the received public key, a digital signature is generated by encrypting the unique code using the private key. The digital signature constitutes a secure endorsement of the transaction data by the second party.

The present invention also involves methods for verifying the secure and tamper resistant secure endorsed transactions. Further, smart cards may be used to provide part of the transaction data being used for the secure and tamper-resistant secure transactions, and to store the previously generated secure and tamper-resistant secure transactions.

It is to be understood that both the foregoing general description and the following detailed description are exemplary and explanatory and are intended to provide further explanation of the invention as claimed.

BRIEF DESCRIPTION OF THE DRAWINGS

The accompanying drawings which are incorporated in and which constitute part of this specification, illustrate a presently preferred implementation of the invention and, together with the description, serve to explain the principles of the invention.

In the drawings.

DESCRIPTION OF THE PREFERRED EMBODIMENT

Reference will now be made in detail to the preferred implementation of the present invention as illustrated in the accompanying drawings. Wherever possible, the same reference numbers will be used throughout the drawings and the following description to refer to the same or like parts.

The present invention provides the capability for generating secure endorsed transactions. In the area of credit card transactions, secure endorsed transactions are created, for example, at the POS, by (1) combining data representative of a transaction (e.g., date, time, merchant identification, sale items, prices, and taxes) with a unique human identifier associated with the credit card holder (e.g., digitized signature, biometric, retinal pattern, and finger print), and (2) generating a unique code based on the combination that is representative of the endorsed transaction. The unique code may be generated by using a checksum algorithm such as CRC or XOR or a message digest from RSA Data Security, Inc., USA (see BSAFE, User's Manual, Version 2.1, p. 42, 1992), or other algorithms with similar characteristics. This unique code is stored for use during verification process.

Verification that the combined data is unmodified, and thus, original, is done by recalculating a new computed unique code based on the combined data and comparing the new computed code with the original stored unique code. If the comparison is a match, the data is unmodified and thus, original. If the comparison fails, the data is modified and thus, not original.

By use of public keys or like algorithms, the combined data can be further processed to demonstrate authenticity.

Figure 1:
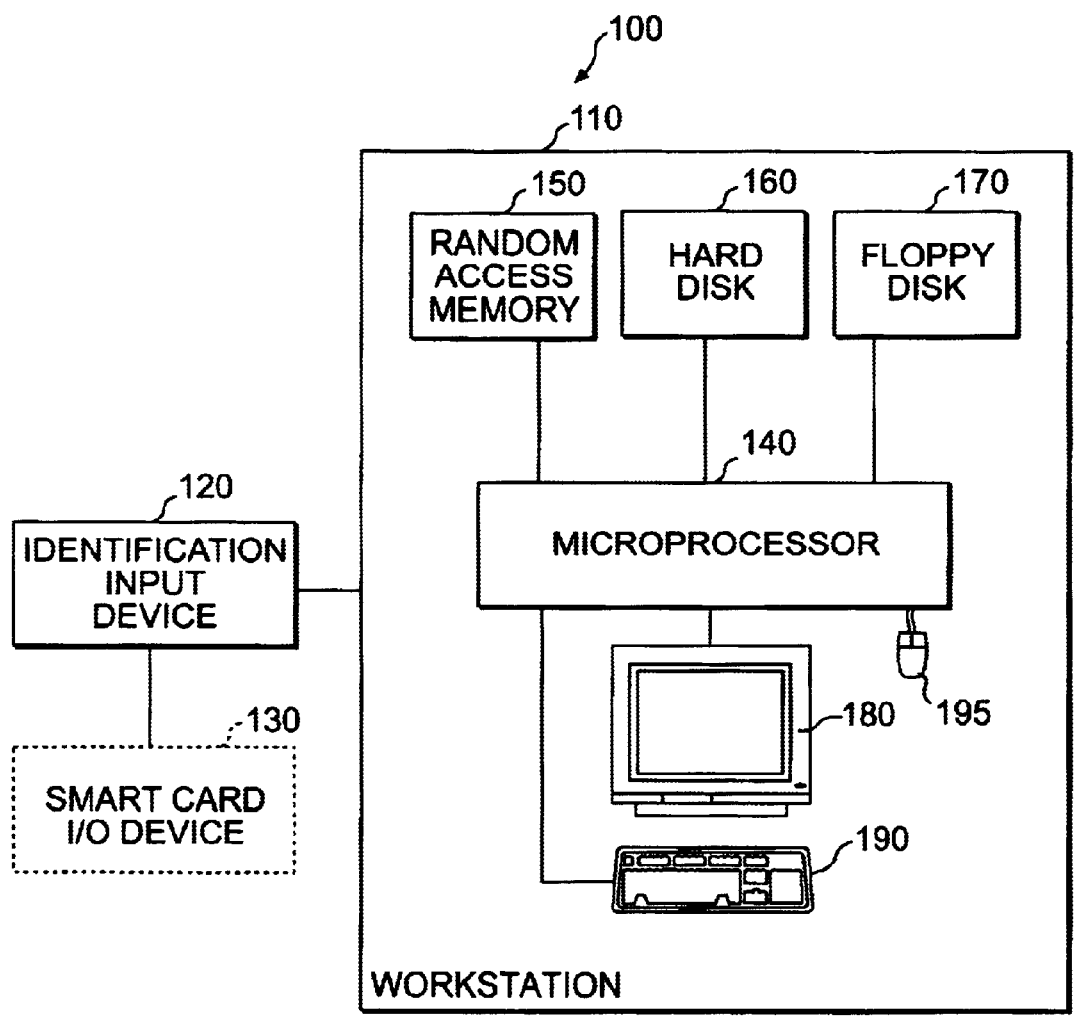
FIG. 1 is a block diagram of the hardware architecture for a secure endorsed transaction system according to an embodiment of the present invention.

FIG. 1 shows the hardware architecture for a secure endorsed transaction system 100 according to an embodiment of the present invention.

The system 100 includes a workstation 110, which includes hardware for a standard personal computer (for example, an IBM compatible personal computer) and an identification input device 120, and an optional smart card I/O device 130. For credit card applications, the system 100 may be located at the POS. Other examples, such as online insurance enrollment, may have the system 100 functioning as a laptop computer and be located at the enrollment location, or for medical treatment authorization, the system 100 may be located at the patient admissions office, or for finance applications, the system 100 may be located at the bank's branch office, or for I-9, W4, and related personnel files, the system 100 may be located in the human resource department, or for an online driver license application, the system 100 may be located at the Department of Motor Vehicles branch locations.

Alternatively, part of the system, i.e., workstation 110 may be located at a remote location with electrical connections to the identification input device 120.

The workstation 110 consists of a microprocessor 140, random access memory (RAM) 150, hard disk 160, floppy disk and drive 170, video display 180, keyboard 190, and mouse 195. These may be standard off-the-shelf hardware. For example, the microprocessor 140 may be a Pentium® processor manufactured by Intel Corp., USA, and the video display 180 may be a NEC MultiSync 3V monitor manufactured by NEC Corp., Japan. Alternatively, the workstation 110 may include one or more specialized digital signal processing chips as coprocessors to support processing functions described below.

The RAM memory 150 may be substituted with other memory devices such as PROM that are suitable for storing programs. The storage devices, hard disk 160, floppy disk 170 are optional and only necessary for local storage. Alternatively, the storage may be located remote from the microprocessor 140 and RAM memory 150 with appropriate interconnections to access the storage devices. Further, other storage devices such as CD-ROMs, Hierarchial File Systems, Magnetic Tapes, may be employed. The video display 180, keyboard 190, and mouse 195 are optional devices and not necessary to the invention.

The identification input device 120 may be a signature capture device such as the PenWare2000 manufactured by PenWare, Inc., Palo Alto, Calif., USA, or other similar device capable of capturing a digitized signature, which is a unique identifier associated with its author. Alternatively, the device 120 may be a finger print scanner, retinal scanner, or other biometric input device. The one thing common to all of the these exemplary input devices is that they generate a unique identifier associated with an individual that is unique to the individual and non-transferable.

The optional smart card I/O device 130 may also be comprised of conventional hardware. One such smart card I/O device is manufactured by Neuron Electronics Inc., U.S.A. Alternatively, the smart card may be attached directly to the system 100.

The system 100 may also include a telephone port or other communication port (not shown) for connecting the workstation 110 to a public switched telephone network or another type of network, such as the Internet, an Intranet, LAN, WAN, etc. Such a telephone port would include a switch, which may be controlled by the microprocessor 140 (and also by DTMF tone receivers in the telephone port), that can connect a telephone (not shown) to the public switched telephone network or to the microprocessor 140. A telephone port would be required if the workstation 110 is connected to the identification input device 120 at a remote location, in which case both the workstation 110 and remote POS equipment such as the remote input identification device 120 may include conventional modems capable of electrically connecting them via a public switched telephone network. Those skilled in the art will recognize that there are many other methods for electrically connecting identification input device 120 of the type described above with the workstation 110.

(1) Creating Tamper-resistant Secure Endorsed Transactions

Figure 2:
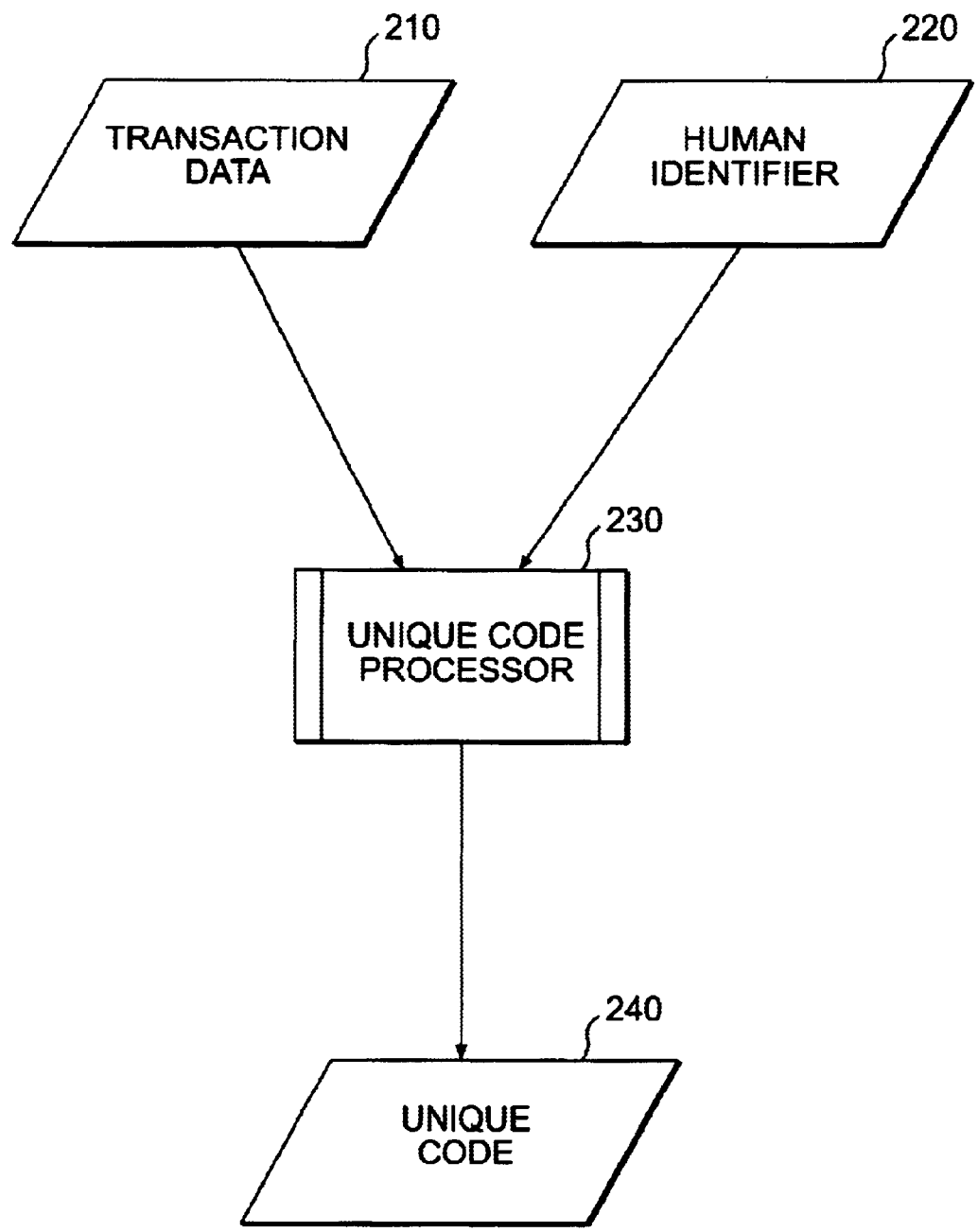
FIG. 2 is an operational flow chart of the process used for generating a unique code based on both data representative of a transaction and a unique human identifier, according to the embodiment of the present invention.

FIG. 2 is an operational flow chart of the procedure used by the workstation 110 to combine transaction data 210, which in this example, is a credit card transaction receipt, with a unique human identifier 220 associated with an individual, for example, a credit card holder, who has endorsed the transaction, in this example, a credit card transaction, and to generate a unique code 240 based on the combination that is representative of the endorsed transaction. As shown, both transaction data 210, which is data representative of a transaction and may include, among other items, date, time, merchant identification, sale items, prices, and taxes, as well as printer language commands, form description language commands, form definition commands, and a unique human identifier 220, which may be a digitized signature, biometric, retinal pattern, and finger print, or the like, are provided to a unique code processor 230 that generates a unique code corresponding to the inputs 210 and 220. Those skilled in the art will recognize that various other transactions, such as on-line insurance enrollment forms, patient admission forms, finance applications, personnel files, on-line driver license applications and the like, may be used in place of the POS credit card example without detracting from the scope of the present invention.

The unique code processor 230 is a software program, for example, executed by the microprocessor 140, that satisfies the following conditions: (1) The processor 230 generates a unique code based on the inputs 210 and 220 that is computationally infeasible to duplicate. (2) It is computationally infeasible for the processor 230 to produce the same code from different combinations of the inputs 210 and 220.

In the preferred implementation, the processor 230 is comprised of a message digest software program produced by RSA Data Security, Inc., USA. Alternatively, checksum software programs or other comparable software may be used, provided they meet the criteria outlined above.

Figure 3:
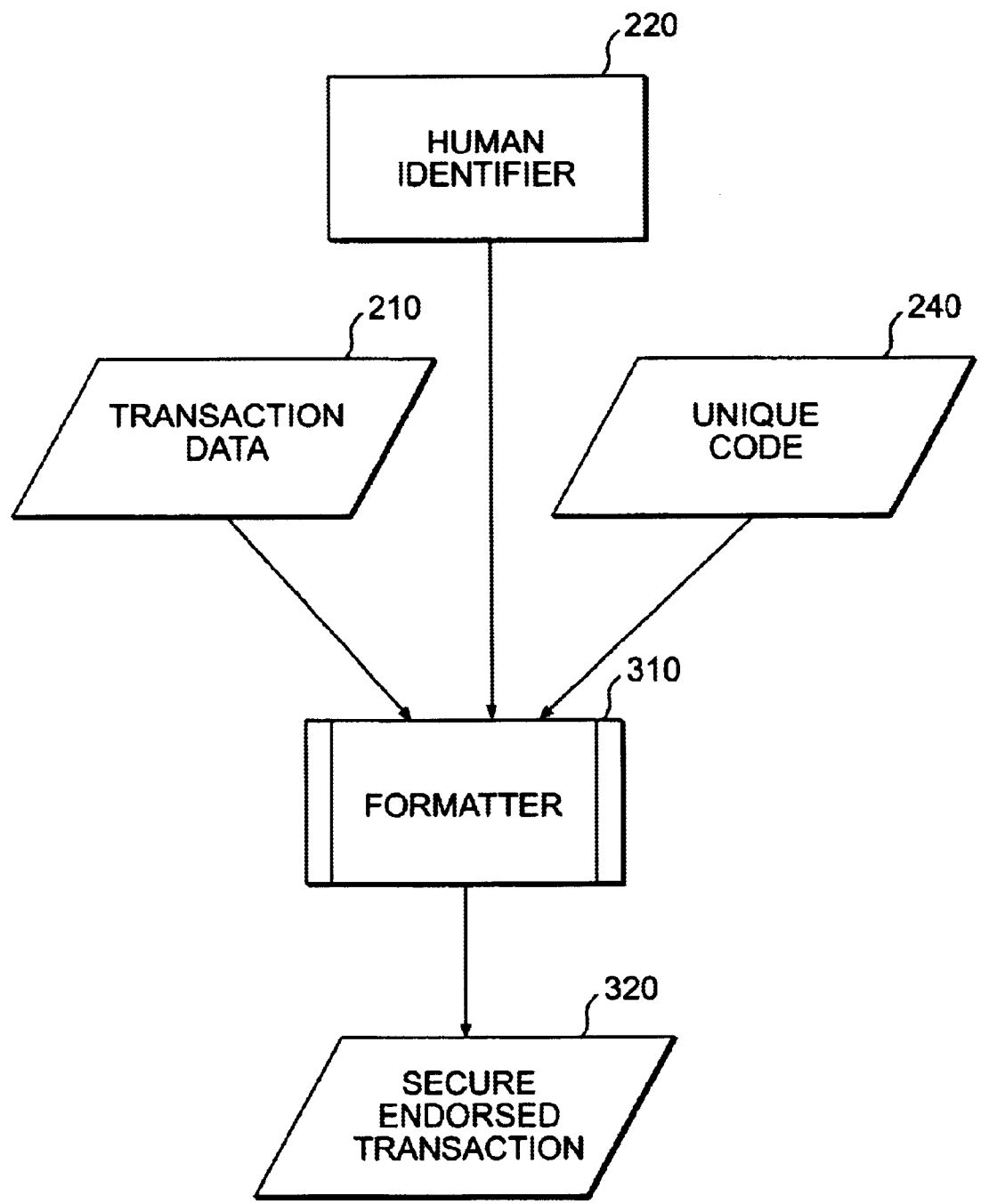
FIG. 3 is an operational flow chart of the procedure used to create single whole representations of secure endorsed transactions according to the embodiment of the present invention.

FIG. 3 is an operational flow chart of the procedure for generating a secure endorsed transaction using the unique code 240. First, it should be understood that the unique code 240 generated by the unique code processor 230 is a secure endorsement of the transaction in the transaction data 210 by the individual identified in the human identifier 220, which was used by the processor 230 to generate the unique code 240. A secure endorsed transaction consists of a combination of the transaction data 210, human identifier 220, and unique code 240. As shown in FIG. 3, the transaction data 210, human identifier 220, and unique code 240 are combined by a formatter 310, and the resulting combination constitutes a secure endorsed transaction 320 of the transaction specified in the transaction data 210. The formatter 310 is a software program, for example, executed by the microprocessor 140 that combines the three inputs 210, 220, and 240 into a single representation, called a single whole representation of the secure endorsed transaction, which may be stored in the hard disk 160, floppy disk 170, or another storage device such as a WORM (write once readable memory) like a CD-ROM.

The single whole representation of the secure endorsed transaction 320 may also be stored on a smart card using the device 130. According to this aspect of the present invention, the smart card may contain both credit card information for the transaction as well as a copy of single whole representation of the secure endorsed transaction 320. The device 130 could be used to read the credit card information from the smart card and to store the transaction information onto the smart card. This way the credit card (read, smart card) holder has an electronic copy of the transaction data or receipt or single whole representation of the secure endorsed transaction 320 that may be compared with a copy stored by the merchant for verification purposes.

For credit card transactions, the unique code processor 230 and formatter 310 may be employed in POS equipment to allow merchants to store the single whole representations of secure endorsed transactions. In such cases, the transaction data 210 and the human identifier 220 would be captured at the POS as the cardholder, for example, signs the credit card receipt. The unique code processor 230 and formatter 310 would then generate the single whole representation of secure endorsed transaction 320 that can be transmitted to the credit card processor, where the data is stored for a predetermined period of time. Alternatively, the single whole representation of secure endorsed transaction 320 may be stored at the merchant's site, removing the dependency a merchant has on the transaction processor. Because the integrity of the single whole representation of the secure endorsed transaction 320 is critical to the operation of the system 100, mass storage devices that provide write-once read-many times capability are particularly appropriate for storing the single whole representation of the secure endorsed transaction 320 when the underlying transaction involves the use of a credit card.

Figures 8, 9:
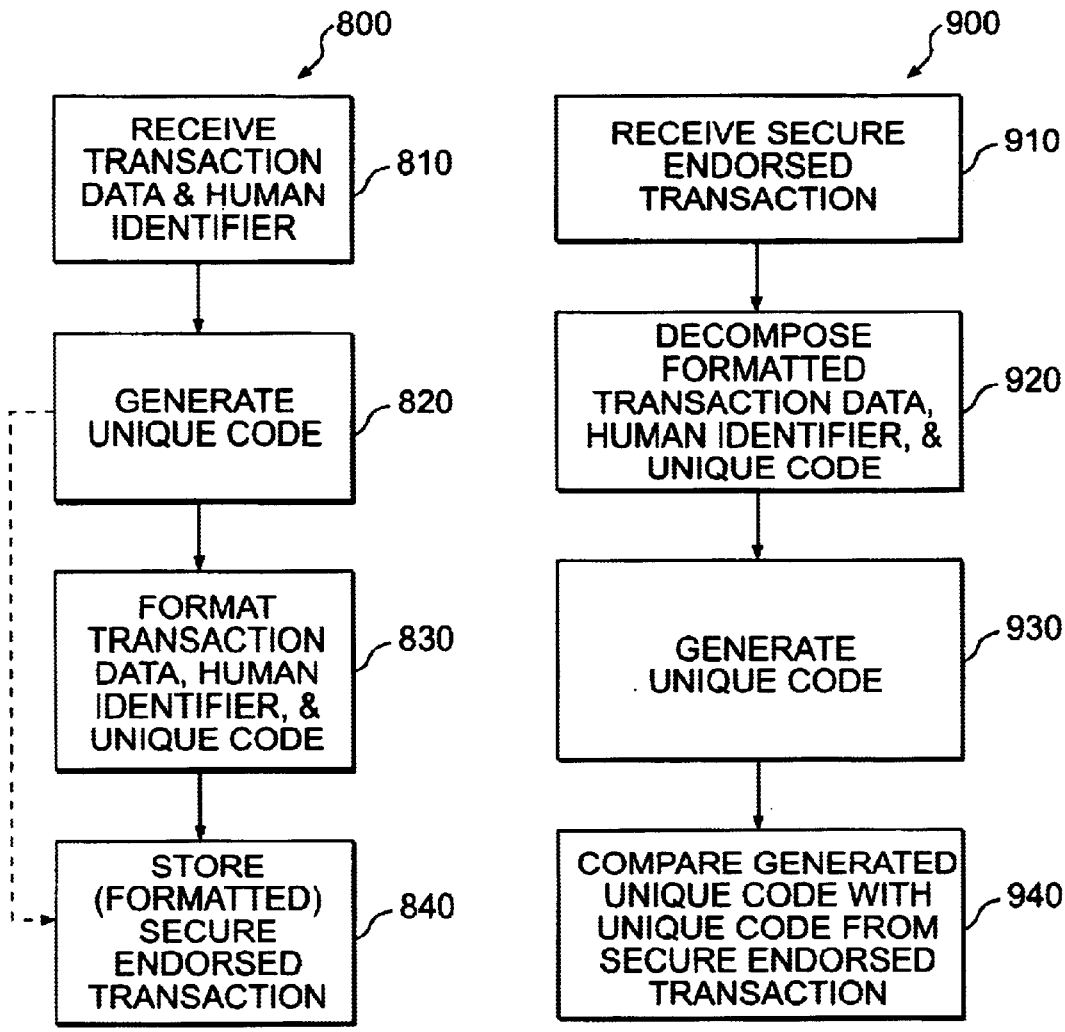
FIG. 8 is a process flow chart of the steps used to create a secure endorsed transaction, according to the embodiment of the present invention.
FIG. 9 is a process flow chart of the steps used to verify a secure endorsed transaction, according to the embodiment of the present invention.

FIG. 8 illustrates the procedure 800 used by the system 100 to generate secure endorsed transactions. In the preferred embodiment, the procedure 800 is implemented in software executable by the microprocessor 140.

As a first step in the process, the microprocessor 140 receives transaction data and a human identifier (step 810). As explained above, the transaction data typically includes data related to a transaction such as a retail purchase. The human identifier (such as a biometric, signature, finger print, retinal print, etc.) corresponds to a human that has endorsed the transaction, for example, the individual making the retail purchase. (The transaction data and human identifier may come from POS equipment in a merchant's establishment or from comparable equipment located elsewhere. For example, it may be possible to connect the POS-type equipment to computers connected to the Internet, thus using the Internet for secure endorsed transactions.)

Next, using the unique code processor 230, the microprocessor 140, generates a unique code from the transaction data and human identifier (step 820). The combination of this unique code and the input transaction data and human identifier constitute a secure endorsed transaction because if either the transaction data or human identifier is altered in any way, a unique code matching the endorsed transaction data could not be recreated. This is, however, a function of the unique code processor 230, as explained above.

The secure endorsed transaction may be stored in a database, with the component parts (transaction data, human identifier, and unique code) in tables or the like (step 840), as shown in the procedure 800 by the broken line connecting steps 820 and 840. Alternatively, before storing the secure endorsed transaction (step 840), the secure endorsed transaction may also be combined into a single whole representation of the secure endorsed transaction. Using the formatter 310, the microprocessor 140 would combine the individual components of the secure endorsed transaction into a single whole representation of the secure endorsed transaction (step 830). The single whole representation of the secure endorsed transaction could then be stored as one data item representing the transaction (step 840). One advantage of step 830 is that it permits a subsequent transmission of the single whole representation of the secure endorsed transaction as one data item to, for example, a credit card transaction processor for approval of the transaction and/or long term storage.

(2) Verifying Tamper-resistant Secure Endorsed Transactions

Figure 4:
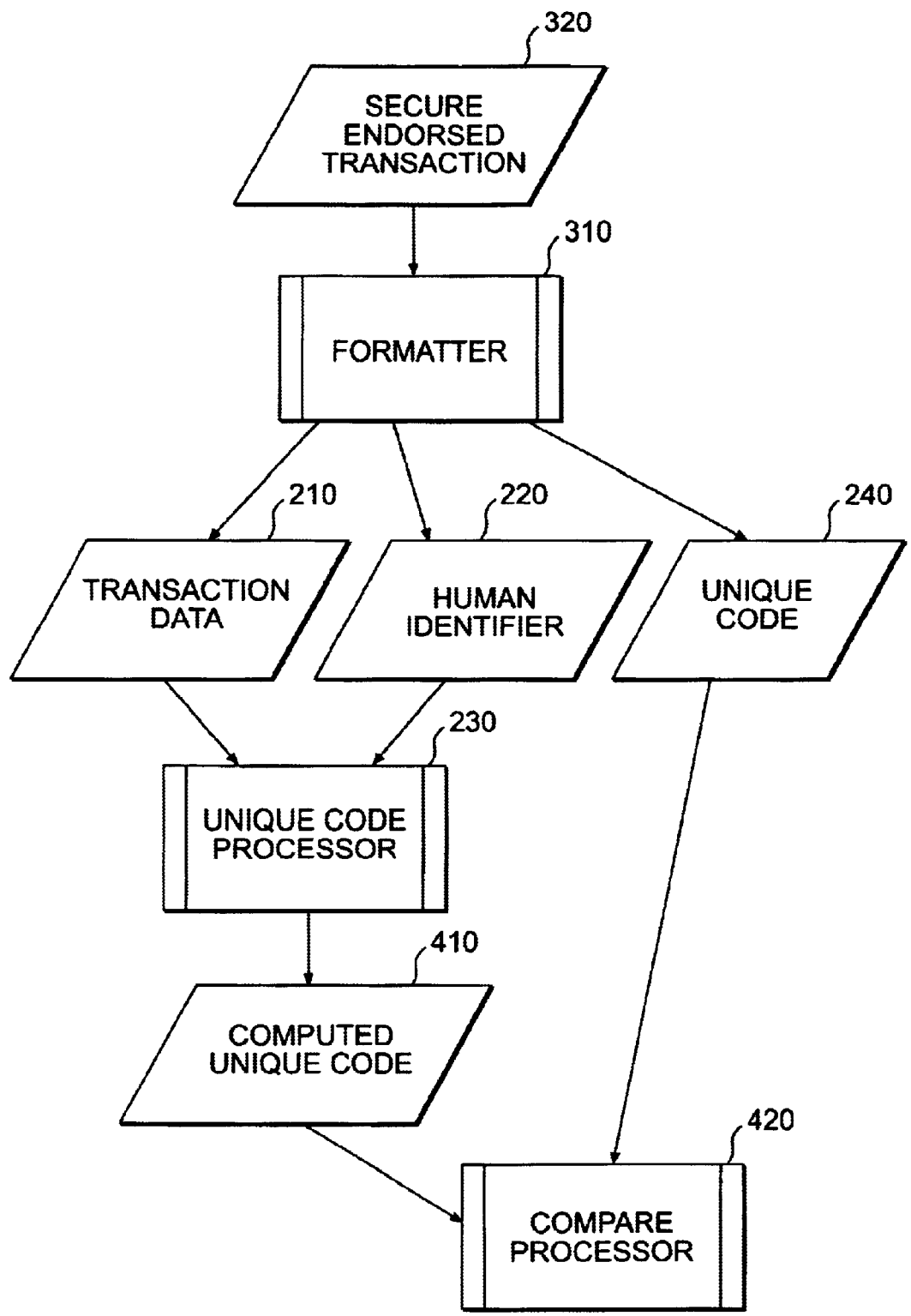
FIG. 4 is an operational flow chart of the procedure used to verify the integrity of a secure endorsed transaction according to the embodiment of the present invention.

FIG. 4 is an operational flow chart of the procedure used, for example, by microprocessor 140, to verify a secure endorsed transaction 320. As shown, the verification procedure is substantially the reverse of the procedures outlined in FIGS. 2 and 3 for creating the secure endorsed transaction. First, the formatter 310 is used to decompose the secure endorsed transaction into the component parts: transaction data 210, human identifier 220, and unique code 240. The decomposed transaction data 210 and human identifier 220 are then processed by the unique code processor 230 to generate a new, computed unique code 410. The decomposed unique code 240 from the secure endorsed transaction 320 and the computed unique code 410 are then processed by a compare processor 420 to determine whether there is a match. If not (i.e., the computed code does not equal the decomposed unique code), then the secure endorsed transaction 320 was changed and, thus, tampered with prior to execution of the verification procedure (and an appropriate error message or other signal is generated). The compare processor 420 is a software program, for example, executable by the microprocessor 140. The program compares two inputs to determine if they are identical.

Alternatively, if the compare processor 420 determines that the codes 410 and 240 match, then the secure endorsed transaction 320 (is original and)was not tampered with prior to verification. At this time, the secure endorsed transaction 320 can be processed, for example, displayed, faxed, printed, etc. In the credit card example, the secure endorsed transaction 320 could be printed as a signed credit card receipt for visual inspection and verification by humans.

Those skilled in the art will recognize that various modifications may be made to the preferred embodiment without detracting from the scope of the present invention. For example, instead of using the formatter 310 to create a single whole representation of the secure endorsed transaction 320, the human identifier 220, transaction data 210, and unique code 240 may be stored in a database, such as a relational database, located, for example, on the hard disk 160. In this case, the verification process would also not involve the use of the formatter 310. Instead, transaction data 210 and a corresponding human identifier 220 are extracted from the database, processed by the unique code processor 230 to generate a new computed unique code 410, which would then be compared by the compare processor 420 with the unique code 240 stored in the database as corresponding to the transaction data 210 and human identifier 220. If the two codes 240 and 410 match, verification was successful; otherwise, at least one part of the transaction data 210, human identifier 220, and unique code 240 was altered prior to execution of the verification process.

FIG. 9 illustrates the procedure 900 used by the system 100 to verify secure endorsed transactions, and to ensure that neither the transaction data nor the human identifier of the secure endorsed transaction has been altered. In the preferred embodiment, the procedure 900 is implemented in software executable by the microprocessor 140.

As a first step, the microprocessor 140 receives the secure endorsed transaction (step 910). If the secure endorsed transaction was formatted by, for example, the formatter 310, into a single whole representation of the secure endorsed transaction then it may be necessary for the microprocessor 140 to decompose the single whole representation of the secure endorsed transaction (step 920). Next, or after step 910, the microprocessor 140, using the unique code processor 230, generates a new unique code from the transaction data and human identifier found in the secure endorsed transaction (step 930). This computed unique code is then compared with the unique code that was a part of the input secure endorsed transaction (step 940). If the two codes match, then the verification process confirmed that neither the transaction data nor the human identifier of the secure endorsed transaction has been altered. Otherwise, then one of the items was altered, in which case the appropriate error or signal is generated. (By further analysis of the secure endorsed transaction, it may also be possible to determine which of the transaction data and human identifier was altered. This information may be displayed as well. One way to determine which data item has been altered would be to add a checksum to each data item when they are initially created.)

(3) Creating Forge-Resistant, Tamper-Resistant Secure Endorsed Transactions

As more fully explained below, tamper-resistant secure endorsed transactions may be made forge-resistant by adding the digital signature endorsement of a second party, for example, the merchant making a credit card sale. See BSAFE, User's Manual, Version 2.1, p. 51, 1992, RSA Data Security, Inc.

Figure 5:
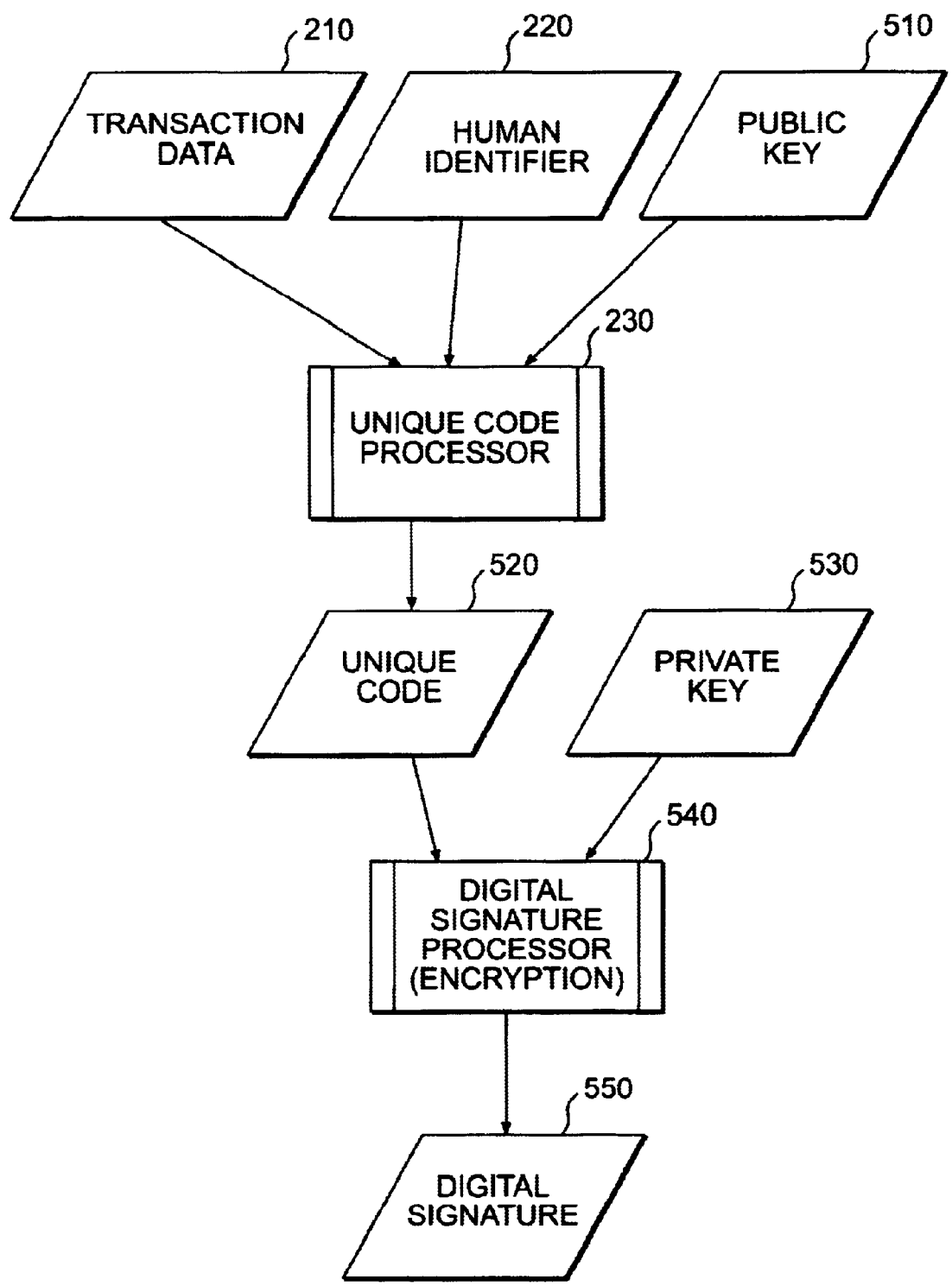
FIG. 5 is an operational flow chart of a process used for generating a digital signature based on data representative of a transaction, a unique human identifier corresponding to one party who has endorsed the transaction, and a public key corresponding to a second party who has endorsed the transaction, according to the embodiment of the present invention.

FIG. 5 is an operational flow chart of a procedure for generating a digital signature for use in creating a forge-resistant secure endorsed transaction. A forge-resistant secure endorsed transaction is endorsed separately by both the individual associated with the human identifier and the second party to the transaction, i.e., the merchant. The properties essential to ensuring forge-resistancy are that with a public key system, one key can decrypt the other key's encrypted data and it is impossible to determine the key value of one key from examination of the other key. Further, encrypted data from one key can not be decrypted using the same key. The procedure illustrated in FIG. 5 uses public key cryptography of the type suggested by RSA Data Security, Inc., USA, and involves assigning a public key and private key pair to the merchant, in the credit card example, for use in encrypting and decrypting a digital signature associated with a secure endorsed transaction.

As shown in FIG. 5, the transaction data 210 and human identifier 220 are provided to the unique code processor 230 along with a public key 510 associated with the merchant identified, for example, with the transaction data 210. The unique code processor 230 generates a unique code 520, which, like the unique code 240, is unique to the inputs 210, 220, and 510 and is computationally infeasible to duplicate, is computationally infeasible to produce from a different combination of the inputs 210, 220, and 510, and can be verified by code processor 230 as having been derived from the inputs 210, 220, and 510.

The unique code 520 is then provided to a digital signature processor 540 along with a private key 530 corresponding to the public key 510 and owned by the merchant. The digital signature processor 540 generates a digital signature 550, encrypting the unique code 550 using, as input, private key 530, that guarantees the identity of the author of the secure transaction.

In the preferred implementation, the digital signature processor 540 is a software program produced by RSA Data Security, Inc., USA. It generates an output, known as a digital signature, using a private key 530 that can only be decrypted using the associated public key 510. Other comparable software programs may be used without detracting from the scope of the present invention.

Figure 6:
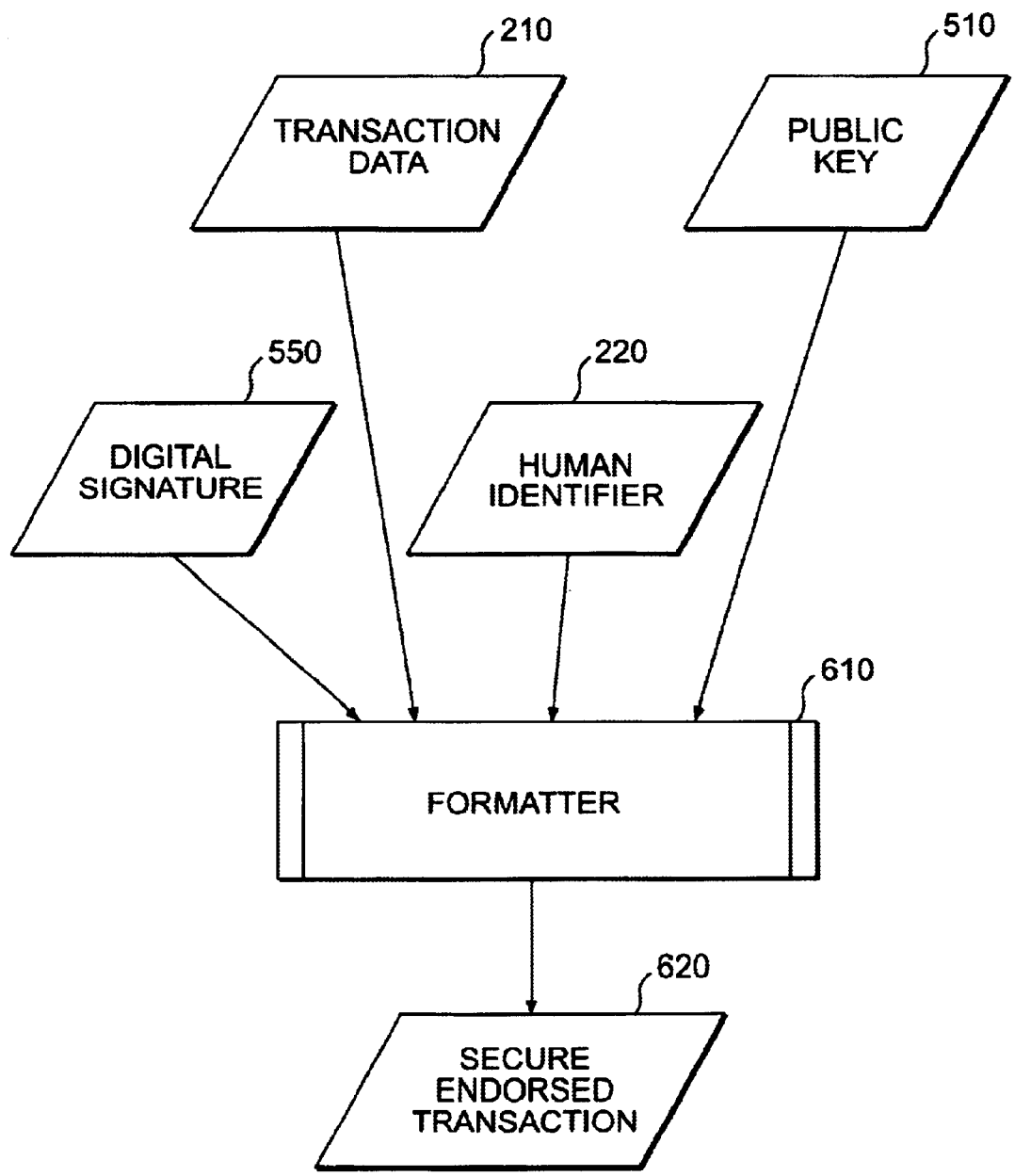
FIG. 6 is an operational flow chart of the procedure used to create single whole representations of secure endorsed transactions using digital signatures, according to the embodiment of the present invention.

FIG. 6 is an operational flow chart of the procedure for generating a forge-resistant secure endorsed transaction using the digital signature 550. First, it should be understood that the unique code 520 generated by the unique code processor 230 is a secure endorsement of the transaction by the human identified in the human identifier 220, which was used by the processor 230 to generate the unique code 520. The digital signature 550 provides a further level of security to the stored representation of the secure endorsed transaction by providing a unique identifier (private key 530) indicating endorsement of the transaction (specified in the transaction data 210) by the owner of the private key 530 (e.g., a merchant).

As shown in FIG. 6, the transaction data 210, human identifier 220, public key 510, and digital signature 550 are combined by a formatter 610, and the resulting combination constitutes a secure endorsed transaction 620 that is both tamper-resistant and forge-resistant. In this case, the represented transaction has been endorsed by both the individual specified by the human identifier 220 and owner of the private key 530 used to generate the digital signature 550.

The formatter 610 is a software program, for example, executed by the microprocessor 140 that combines the four inputs 210, 220, 510, and 550 into a single representation, called a single whole representation of the tamper-resistant secure endorsed transaction 620, which may be stored in the hard 160, floppy disk 170, or another storage device such as a WORM (write once read many) like a CD-ROM. The single whole representation of the tamper-resistant secure endorsed transaction 620 may also be stored on a smart card in a manner similar to the representation 320 described above with reference to FIG. 3.

The single whole representation of tamper-resistant secure endorsed transactions may be stored on a write-once, read-many times device as described earlier, however, this is no longer necessary. The digital signature 550 is encrypted which protects the identity to unauthorized individuals. As such, it is computationally infeasible for unauthorized individuals (individuals without knowledge of the private key 530) to replicate the secure endorsed transactions.

For credit card transactions, the unique code processor 230 and formatter 610 may be employed in POS equipment to allow merchants to store a plurality of single whole representations of secure endorsed transactions. In such cases, POS equipment would generate the transaction data and the human identifier would be captured at the POS as the cardholder, for example, signs the credit card receipt using a signature capture device or another identification input device 120. The unique code processor 230 and formatter 610 would then generate the single whole representation of secure endorsed transactions that can be transmitted to the credit card processor, where the data is stored for a predetermined period of time.

Figures 10, 11:
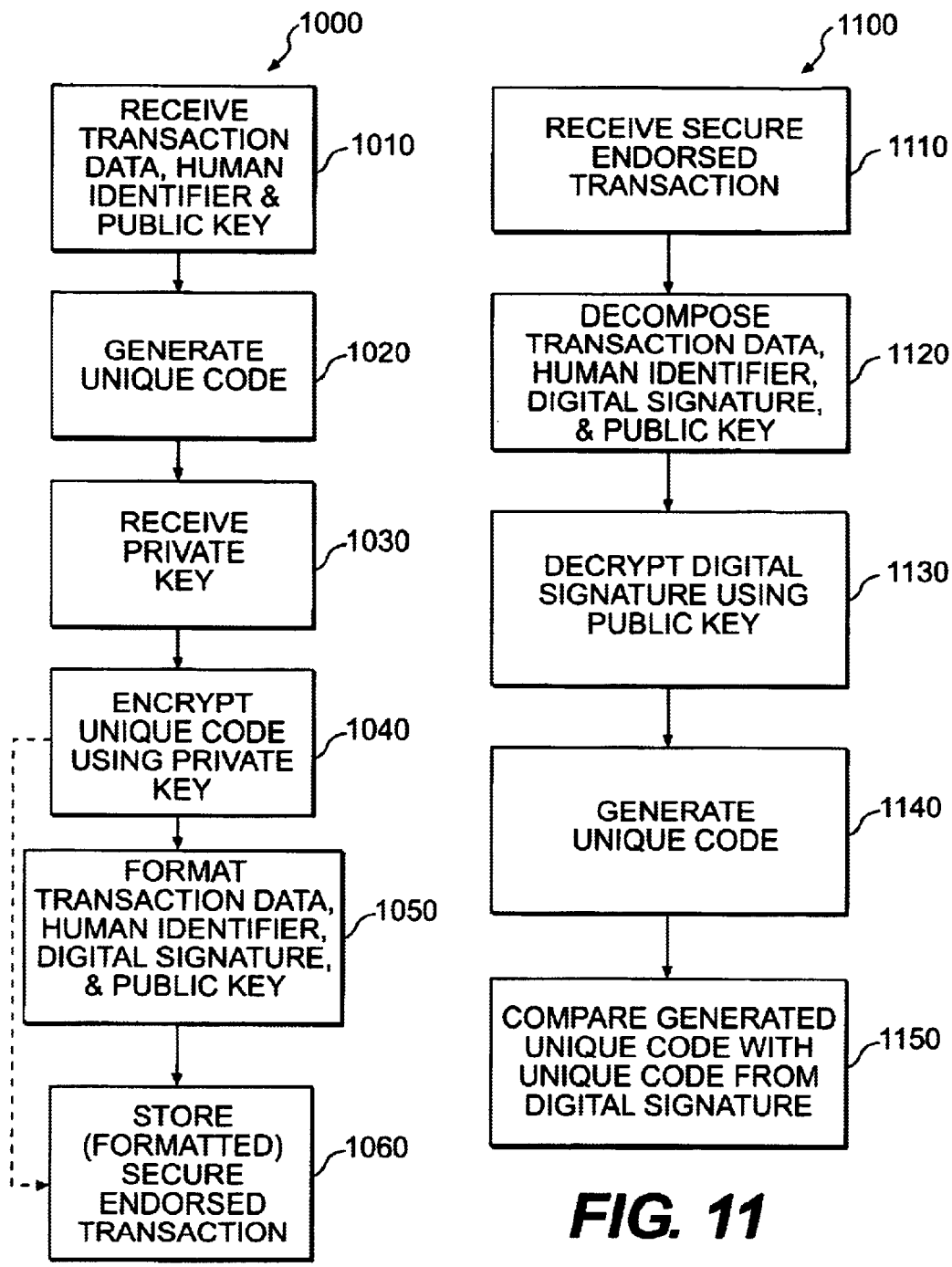
FIG. 10 is a process flow chart of the steps used to create a secure endorsed transaction using digital signatures, according to the embodiment of the present invention.
FIG. 11 is a process flow chart of the steps used to verify a secure endorsed transaction created using digital signatures, according to the embodiment of the present invention.

FIG. 10 illustrates the procedure 1000 used by the system 100 to generate forge-resistant secure endorsed transactions. In the preferred embodiment, the procedure 1000 is implemented in software executable by the microprocessor 140.

As a first step in creating a forge-resistant secure endorsed transaction, the microprocessor 140 would receive the transaction data itself as well as a human identifier, for example the buyer, for one party to the transaction as well as public key for the other party, for example the merchant, to the transaction (step 1010). The transaction data and unique identifier are used to generate a unique code (step 1020), in the same manner as that discussed above with reference to FIG. 8.

For the second endorsement, the second party to the transaction, the party associated with the public key (received in step 1010), the microprocessor 140 receives a private key, which corresponds to the public key and is maintained secret by the second party to the transaction. (step 1030). The unique code generated in step 1020 is then encrypted with the private key to generate a digital signature (step 1040).

The secure endorsed transaction may be stored in a database, with the component parts (transaction data, human identifier, unique code, and public key) in tables or the like (step 1060), as shown in the procedure 1000 by the broken line connecting steps 1040 and 1060. Alternatively, before storing the secure endorsed transaction (step 1060), the secure endorsed transaction may also be combined into a single whole representation of the secure endorsed transaction. Using the formatter 610, the microprocessor 140 would combine the individual components of the secure endorsed transaction into a single whole representation of the secure endorsed transaction (step 1050). The single whole representation of the secure endorsed transaction could then be stored as one data item representing the transaction (step 1060). One advantage of step 1050 is that it permits a subsequent transmission of the single whole representation of the secure endorsed transaction as one data item to, for example, a credit card transaction processor for approval of the transaction and/or long term storage.

(4) Verifying Forge-Resistant, Tamper-Resistant Secure Endorsed Transactions

Figure 7:
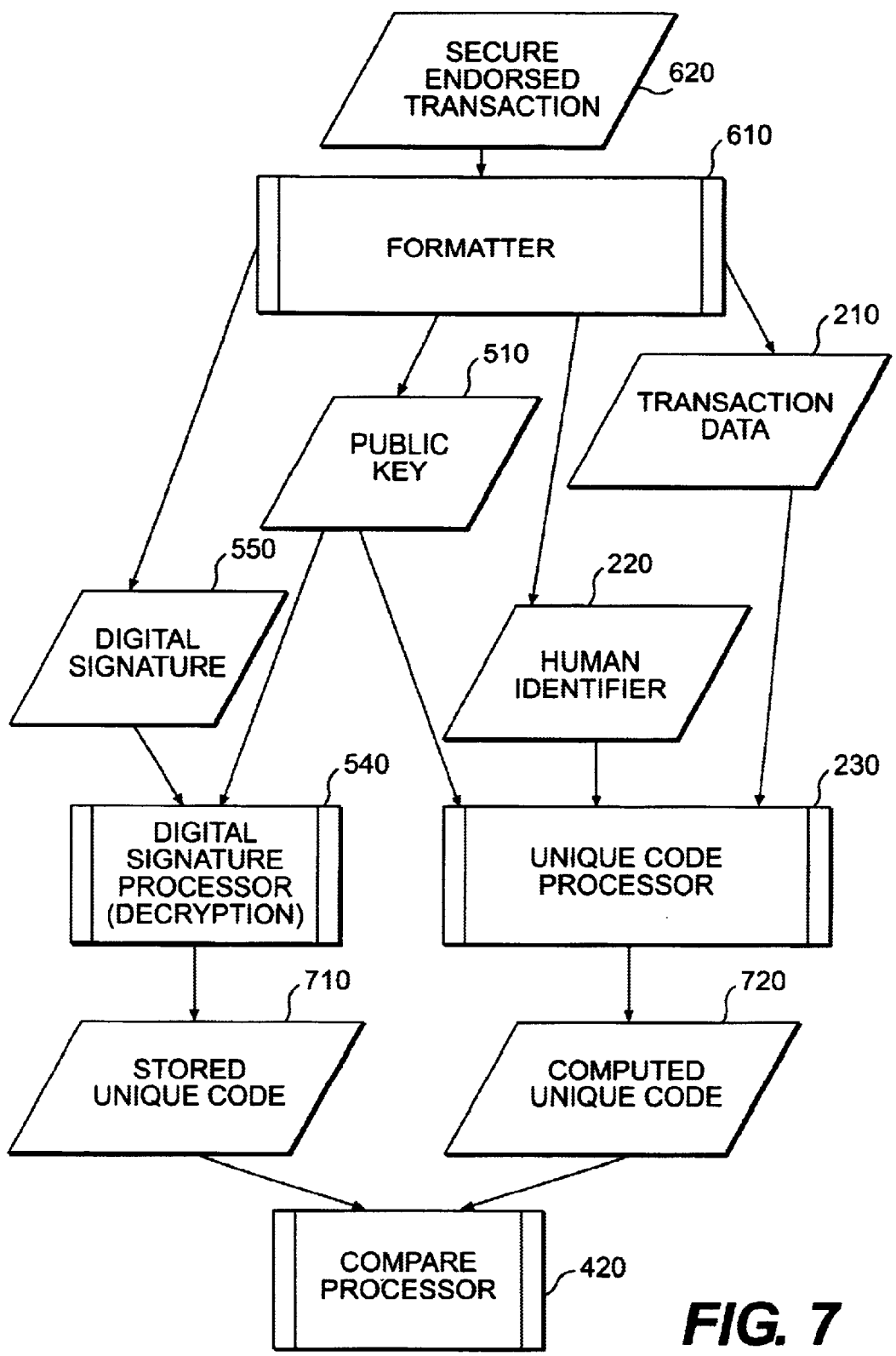
FIG. 7 is an operational flow chart of the procedure used to verify the integrity of a secure endorsed transaction using digital signatures, according to the embodiment of the present invention.

FIG. 7 is an operational flow chart of the procedure used, for example, by microprocessor 140, to verify a forge-resistant single whole representation of a secure endorsed transaction 620. As shown, the verification procedure is substantially the reverse of the procedures outlined in FIGS. 5 and 6 for creating the secure endorsed transaction 620.

First, the formatter 610 is used to decompose the forge-resistant secure endorsed transaction 620 into the component parts: transaction data 210, human identifier 220, and public key 510, and digital signature 550. The decomposed transaction data 210, human identifier 220, and public key 510 are then processed by the unique code processor 230 to generate a new, computed unique code 720. The public key 510 and digital signature 550 are processed by the digital signature processor 540 to decrypt the digital signature 550 and to determine the unique code 710. The compare processor 420 is then used in the same fashion as that described above with reference to FIG. 4, to compare the unique codes 710 and 720 to determine whether there is a match. If not, then the secure endorsed transaction 620 was tampered with prior to execution of the verification process. If the codes 710 and 720 match, the forge-resistant, tamper-resistant secure endorsed transaction 620 can be processed, for example, displayed, faxed, printed, etc. In the credit card example, the forge-resistant tamper-resistant secure endorsed transaction 620 could be printed as a signed credit card receipt for visual inspection and verification by humans.

Those skilled in the art will recognize that various modifications may be made to the preferred embodiment without detracting from the scope of the present invention. For example, instead of using the formatter 610 to create a single whole representation of the secure endorsed transaction, the human identifier 220, transaction data 210, public key 510, and digital signature 550 may be stored individually in a database, such as a relational database, located, for example, on the hard disk 160. In this case, the verification process of FIG. 7 would also not involve the use of the formatter 610. Instead, the human identifier 220, transaction data 210, public key 510, and digital signature 550 are extracted from the database, processed by the unique code processor 230 to generate the new computed unique code 720, which would then be compared by the compare processor 420 with the unique code 710. If the compare processor 420 determines that the codes 710 and 720 match, then the forge-resistant, tamper-resistant secure endorsed transaction 620 (is original and) was not tampered with prior to verification. At this time, the secure endorsed transaction 620 can be processed, for example, displayed, faxed, printed, etc. In the credit card example, the tamper-resistant secure endorsed transaction 620 could be printed as a signed credit card receipt for visual inspection and verification by humans.

Yet another type of unique code may be generated by the unique code processor 230 by processing the human identifier 220 and transaction data 210 along with other data such as a time stamp specifying the time of the transaction. Furthermore, the secure endorsed transactions 320 or 620 can undergo further processing for additional security. For example, additional endorsements, such as a human identifier of a third party, may be appended to either of the transactions 320 or 620 to create secure endorsed transactions with multiple endorsements. In the preferred implementation, only appended endorsements specified in the transaction data 210 are permitted. Thus, before appending additional endorsements, the transaction data 210 is verified to determine whether the transaction data is unmodified and allows additional endorsements.

Additionally, secure endorsed transaction 620 may be verified by a separate certification authority that has an escrow copy of the public key 510. In this way the public key 510 may be compared with an escrow copy of the public key assigned to the merchant to ensure that the specific merchant associated with the secure endorsed transaction 620 endorsed the transaction with its private key 530. This step validates the authenticity of the merchant's public key by a third party and, thus, the authority of the secure endorsed transaction.

FIG. 11 illustrates the procedure 1100 used by the system 100 to verify secure endorsed transactions having digital signatures, and to ensure that neither the transaction data, the human identifier, nor the public key of the secure endorsed transaction has been altered. In the preferred embodiment, the procedure 1100 is implemented in software executable by the microprocessor 140.

As a first step, the microprocessor 140 receives the secure endorsed transaction (step 1110). If the secure endorsed transaction was formatted by, for example, the formatter 310, into a single whole representation of the secure endorsed transaction then it may be necessary for the microprocessor 140 to decompose the single whole representation of the secure endorsed transaction (step 1120). Note that in this case the secure endorsed transaction includes transaction data, a human identifier, a digital signature, and a public key.

Next, or after step 1110, the microprocessor 140, using the digital signature processor 540, decrypts the digital signature of the secure endorsed transaction (step 1130). This step, which uses the public key portion of the secure endorsed transaction, provides the underlying unique code, the endorsement (by human identifier) of one party to the transaction. Subsequently, or even simultaneously, three components of the secure endorsed transaction, i.e., public key, transaction data, and human identifier, are processed by the unique code processor 230 to generate a unique code (step 1140). The two unique codes (one from step 1130 and the other from step 1140) are then compared (step 1150). If the two codes match then the verification process confirmed that neither the transaction data, the human identifier, nor the public key of the secure endorsed transaction has been altered. Otherwise, one of the items was altered, in which case the microprocessor 140 provides this information to the user via, for example, the display 180. (By further analysis of the secure endorsed transaction, it may also be possible to determine which of the components, transaction data, human identifier, or public key was altered. This information may be displayed as well. One way to determine which data item has been altered would be to add a checksum to each data item when they are initially created.)

Throughout the above description of the preferred implementation, other implementations and changes to the preferred implementation were discussed. Thus, this invention in its broader aspects is therefore not limited to the specific details or representative methods shown and described.

We claim:

1. A secure endorsed transaction system, comprising:

an encoder that generates a unique code from input data comprising transaction data, a human identifier that uniquely identifies a human being, and a second key of an asymmetrical key pair that includes the second key and a corresponding first key;

a digital signature processor that generates a digital signature by encrypting the unique code using the first key;

a formatter that formats a secure endorsed transaction using the digital signature and the input data; and a verifier that verifies integrity of the secure endorsed transaction by, as a function of the secure endorsed transaction, comparing a stored unique code derived by decrypting the digital signature using the second key with a computed unique code derived from the second key, the human identifier, and the transaction data.

2. The system of claim 1, further including smart card input/output device for reading and/or writing data representing secure endorsed transactions from and/or to smart cards.

3. The system of claim 2, further comprising:

means for receiving signals from the smart card device indicating the insertion of a smart card.

4. The system of claim 2, wherein the smart card input/output device includes:

means for acquiring card data from a smart card for inclusion in a secure endorsed transaction.

5. The system of claim 2, wherein the smart card input/output device includes:

means for dispatching data representing a secure endorsed transaction to a smart card.

6. The system of claim 1, further comprising:

a biometric input device for receiving signals representing the human identifier that uniquely identifies a human being.

7. The system of claim 1, further comprising:

means for receiving the first key.

8. The system of claim 1, further comprising:

means for receiving the second key.

* * * * *